(12) United States Patent
Lewis

(10) Patent No.: US 11,628,775 B1
(45) Date of Patent: Apr. 18, 2023

(54) ELECTRIC TRUCK LADDER SYSTEM

(71) Applicant: Sean Lewis, Middleburg, FL (US)

(72) Inventor: Sean Lewis, Middleburg, FL (US)

( * ) Notice: Subject to any disclaimer, the term of this patent is extended or adjusted under 35 U.S.C. 154(b) by 150 days.

(21) Appl. No.: 17/202,912

(22) Filed: Mar. 16, 2021

Related U.S. Application Data

(60) Provisional application No. 62/990,035, filed on Mar. 16, 2020.

(51) Int. Cl.
*B60R 3/02* (2006.01)

(52) U.S. Cl.
CPC .............. *B60R 3/02* (2013.01); *B60Y 2200/14* (2013.01)

(58) Field of Classification Search
CPC ............................... B60R 3/02; B60Y 2200/14
See application file for complete search history.

(56) References Cited

U.S. PATENT DOCUMENTS

| | | | | |
|---|---|---|---|---|
| 5,228,707 | A | * | 7/1993 | Yoder .................. B60R 3/02 182/127 |
| 9,156,405 | B1 | | 10/2015 | Levesque |
| 9,981,608 | B1 | | 5/2018 | DoVale et al. |
| 10,457,217 | B1 | | 10/2019 | Lingerfelt |
| 2011/0316298 | A1 | * | 12/2011 | Rampersad .............. G09F 27/00 307/10.1 |
| 2012/0098231 | A1 | * | 4/2012 | Huotari .................. B60R 3/02 280/166 |
| 2018/0093614 | A1 | * | 4/2018 | Hamaguchi ............ B60R 3/02 |
| 2021/0155296 | A1 | * | 5/2021 | Povinelli ............... B60R 7/005 |

OTHER PUBLICATIONS

Tread Lite 24" Single Power Step. Product Listing [online]. © CWI, Inc. 2021. [retrieved on Jan. 3, 2020]. Retrieved from the Internet: <URL: https://www.campingworld.com/tread-lite-24quot%3B-single-power-step-85578.html?gclid=Cj0KCQiAxrbwBRCoARIsABEc9siX_aV9gBGaPP57Cuw8ci9ZGSg-9hO5lj9LI_ZqwoVyVtjbu1ZiG9waAtirEALw_wcB>.

MORryde STP-3-24-21H StepAbove 3 Step. Product Listing [online]. © 1996-2021, Amazon.com, Inc. [retrieved on Mar. 16, 2021]. Retrieved from the Internet: <URL: https://www.amazon.com/MOR-RYDE-STP-3-24-21H-Entry-Step/dp/B07GNMF6T2>.

Kwikee Series 26 Single Electric Step-24" Tread #902609025. Product Listing [online]. © RV Electrical 2019 [retrieved on Mar. 16, 2021]. Retrieved from the Internet: <URL: https://rvelectrical.com/product/kwikee-series-26-single-electric-step-24-tread-902609025/>.

AMP Research 76254-01A Powerstep Electric Running Boards Plug, 1 Pack. Product Listing [online]. © 1996-2021, Amazon.com, Inc. [retrieved on Jan. 3, 2020]. Retrieved from the Internet: <URL: https://www.amazon.com/AMP-Research-76254-01A-PowerStep-Electric/dp/B07G87ZLVQ/ref=asc_df_B07G87ZLVQ/?tag=hyprod-20&linkCode=df0&hvadid=320128206704&hvpos=1o1&hvnetw=g&hvrand=7683053086782728250&hvpone=&hvptwo=&hvqmt=&hvdev=c&hvdvcmdl=&hvlocint=&hvlocphy=9005966&hvtargid=pla-606767490159&psc=1>.

* cited by examiner

*Primary Examiner* — Bryan A Evans
(74) *Attorney, Agent, or Firm* — Cramer Patent & Design, PLLC; Aaron R. Cramer

(57) ABSTRACT

An electric truck ladder system comprises a support frame mounted beneath a vehicle in turn supporting a retractable ladder in hydraulic communication with a switch. The switch permits a user to deploy and/or retract the ladder. The system provides for an adjustable height, adjustable actuator stroke, a switch with wireless remote actuation and/or a door switch which actuates the ladder upon the opening or closing of a vehicle door.

19 Claims, 5 Drawing Sheets

ELECTRIC TRUCK LADDER SYSTEM

RELATED APPLICATIONS

The present invention was first described in and claims the benefit of U.S. Provisional Patent Application No. 62/990,035 filed on Mar. 16, 2020, the entire disclosures of which are incorporated herein by reference.

FIELD OF THE INVENTION

The present invention relates generally to the field of electric truck ladder systems.

BACKGROUND OF THE INVENTION

The popularity of the pick-up style truck as an everyday vehicle continues to grow every day. Their utility and convenience in hauling items coupled with the availability of luxury interiors and extended cab space have made the pickup a popular alternative to other vehicles. The availability of aftermarket accessories also enhances the attractiveness of pickup trucks as well. Perhaps one (1) of the most common accessories is that of the lift kit which allows for the use of larger tires and more ground clearance when traveling over rough terrain.

While such a modification greatly increases the capability of the vehicle, it does make it difficult to get in and out of the vehicle. Those who may be tall and have long, strong legs may have difficulty. However, those who may be small of stature or suffer from a physical disability or injury, may find it impossible to get in and out of such vehicles. While permanent ladders and running boards may help, they reduce the overall ground clearance that the lift was attempting to achieve. Accordingly, there exists a need for a means by which pickup trucks with lift kits can be easily accessed without affecting their ground clearance while travelling. The development of the retractable ladder system for lifted pickup trucks fulfills this need.

SUMMARY OF THE INVENTION

To achieve the above and other objectives, the present invention provides for a retractable ladder system which has a fixed upper step permanently attached to a lifted pickup truck, a ladder extended and deployed from a ladder track, a rotatable joint connected to an actuator rod of a linear actuator, a pair of light assemblies mounted on each side of the ladder track and a plurality of electric power obtained from the lifted pickup truck. The ladder is extended in an outward position and is stowed in a retracted position. The rotatable joint is provided opposite the ladder.

The ladder may provide for a plurality of intermediate steps that the occupant ascends or descends when the ladder is in an outward position. The intermediate steps may be two intermediate steps. The ladder track may be directly connected to a structurally sound element of the lifted pickup truck. The structurally sound element of the lifted pickup truck may be a frame by at least four vertical support members. The linear actuator and an actuator motor may be connected to the vehicle structural member via use of the actuator motor support. An opposite end of the linear actuator may be provided with the actuator motor. The vertical support members, the linear actuator and the actuator motor may be supported by the structurally sound element of the lifted pickup truck.

The ladder may extend underneath the fixed upper step and outward along a horizontal travel path "h" and an arcing travel path "a" thus placing the steps in a horizontal position for ascending or descending by the actuator rod and the rotatable joint. The electric power may be passed through an overcurrent protective device. The overcurrent protective device may be a fuse.

The retractable ladder system may further comprise a plurality of resultant power which is then passed onto a main controller that provides for all logic needed to operate the ladder system. The main controller may be a single board computer. One or more inputs to the main controller may be an input controller. The input controller may be selected from the group consisting of a dash mounted double pole, a double throw switch, a door-mounted jamb switch, or a wireless key fob module. The retractable ladder system may further comprise a light sensor for control of the light assemblies and a microphone for the issuance of voice commands to the main controller.

The retractable ladder system may also further comprise a speaker for issuance of one or more audible warning alerts immediately prior to when the ladder is extending or retracting, a motor housing containing the actuator motor as well as a plurality of travel limit switches, all of which may be connected as an output of the main controller. The electric power may be 12-VDC. The retractable ladder system may allow one or more occupants of the lifted pickup truck to gain entry and exit a passenger compartment of the lifted pickup truck.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
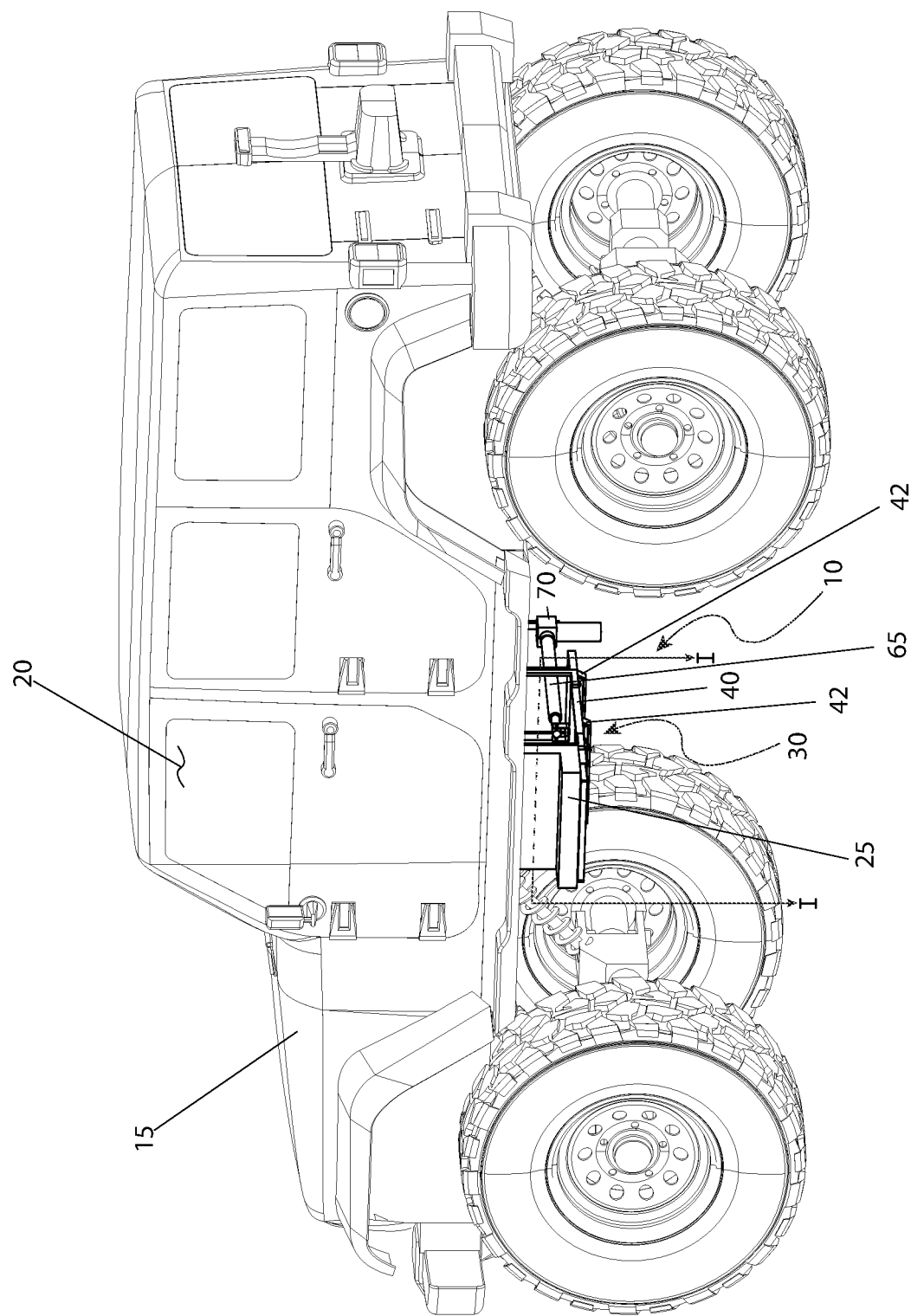
FIG. 1 is a perspective view of the retractable ladder system 10, shown in a utilized state on a lifted vehicle 15, in a retracted state, according to the preferred embodiment of the present invention.

DESCRIPTIVE KEY 10 retractable ladder system
15 lifted vehicle
20 passenger compartment
25 fixed upper step
30 ladder
35 outward position
40 ladder track side member
42 ladder track cross member
45 step
46 rail 50a first vertical support member
50b second vertical support member
50c third vertical support member
55 rotatable joint
60 actuator rod
65 linear actuator
70 actuator motor
75 actuator motor support
80 vehicle structural member
85 horizontal travel path "h"
90 arcing travel path "a"
95 light assembly
100 electrical power
105 overcurrent protective device
110 main controller
115 input controller
120 light sensor
125 microphone
130 speaker
135 driver circuit
140 motor housing
145 travel limit switch

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the retractable ladder system 10 for lifted pickup trucks 15, shown in a utilized state on a lifted vehicle 15, in a retracted state, according to the preferred embodiment of the present invention is disclosed. The retractable ladder system (herein also described as the "system") 10, provides the ability for occupants of the lifted vehicle 15 to easily gain entry and exit to the passenger compartment 20 of the lifted vehicle 15. The system 10 provides for one (1) fixed upper step 25 that remains permanently in position on the lifted vehicle 15 in the same approximate area as a running board would be found on a conventional pickup truck. The ladder 30 is shown in a retracted, horizontal position in this figure. This position would be apparent when the lifted vehicle 15 is in motion and thus would not affect the ground clearance of the lifted pickup truck 15.

Figure 2:
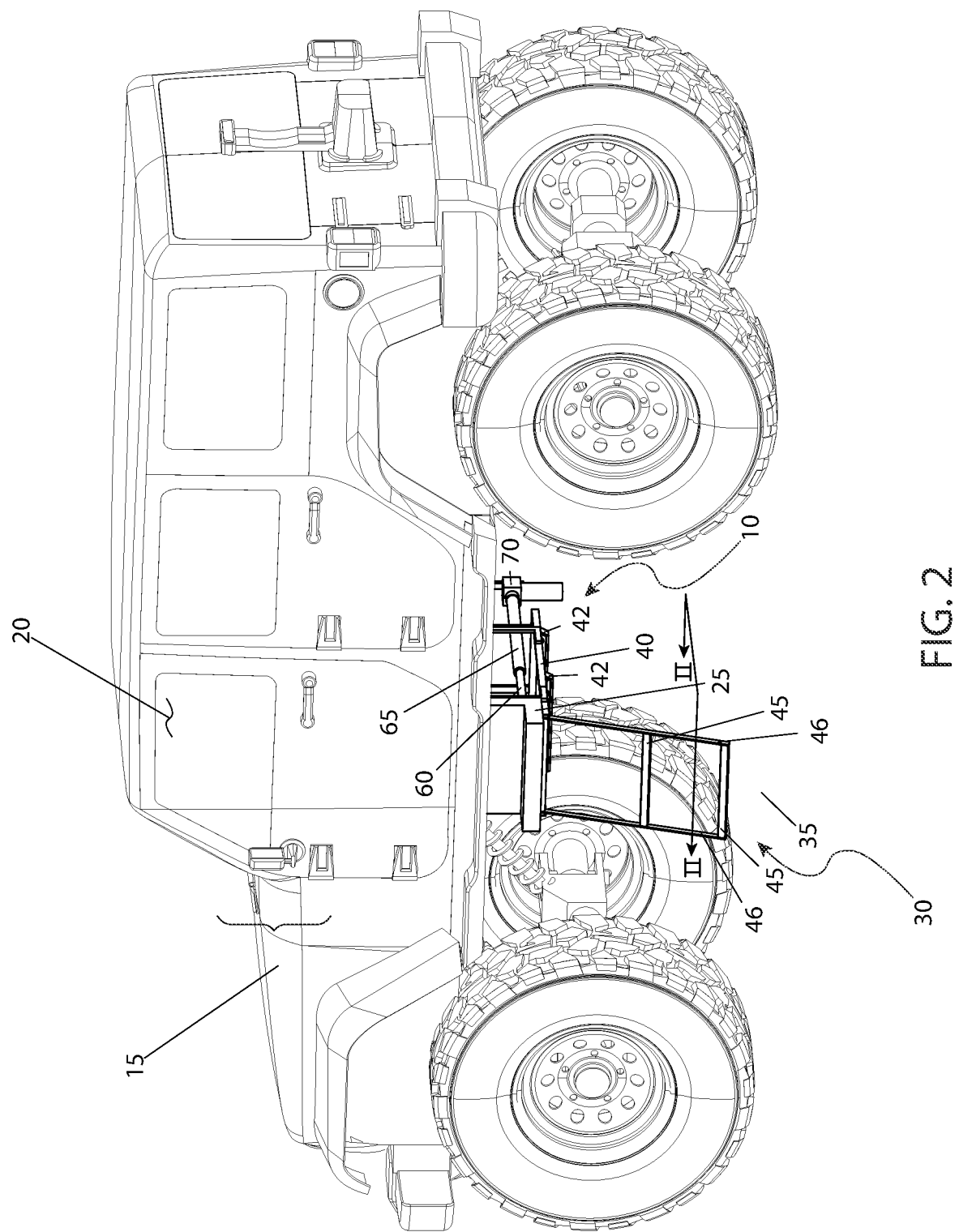
FIG. 2 is a perspective view of the retractable ladder system 10, shown in a utilized state on a lifted vehicle 15, in an extended state, according to the preferred embodiment of the present invention.

Referring next to FIG. 2, a perspective view of the system 10, shown in a utilized state on a lifted vehicle 15, in an extended state, according to the preferred embodiment of the present invention is depicted. As aforementioned described, the fixed upper step 25 remains in its same fixed position. However, the ladder 30 is extended and deployed in an outward position 35. The ladder 30 is deployed from a frame assembly including a pair of ladder track side members 40 and at least a pair of ladder track cross members 42 and will be described in greater detail herein below. In its outward position 35, the ladder 30 preferably comprises a pair of parallel rails 46 and a plurality of intermediate steps 45 that the occupant can ascend or descend for access. The total number of steps 45 as shown in FIG. 2 is two (2) for illustrative purposes. However, the exact quantity of steps 45 is not intended to be a limiting factor of the present invention.

Figure 3:
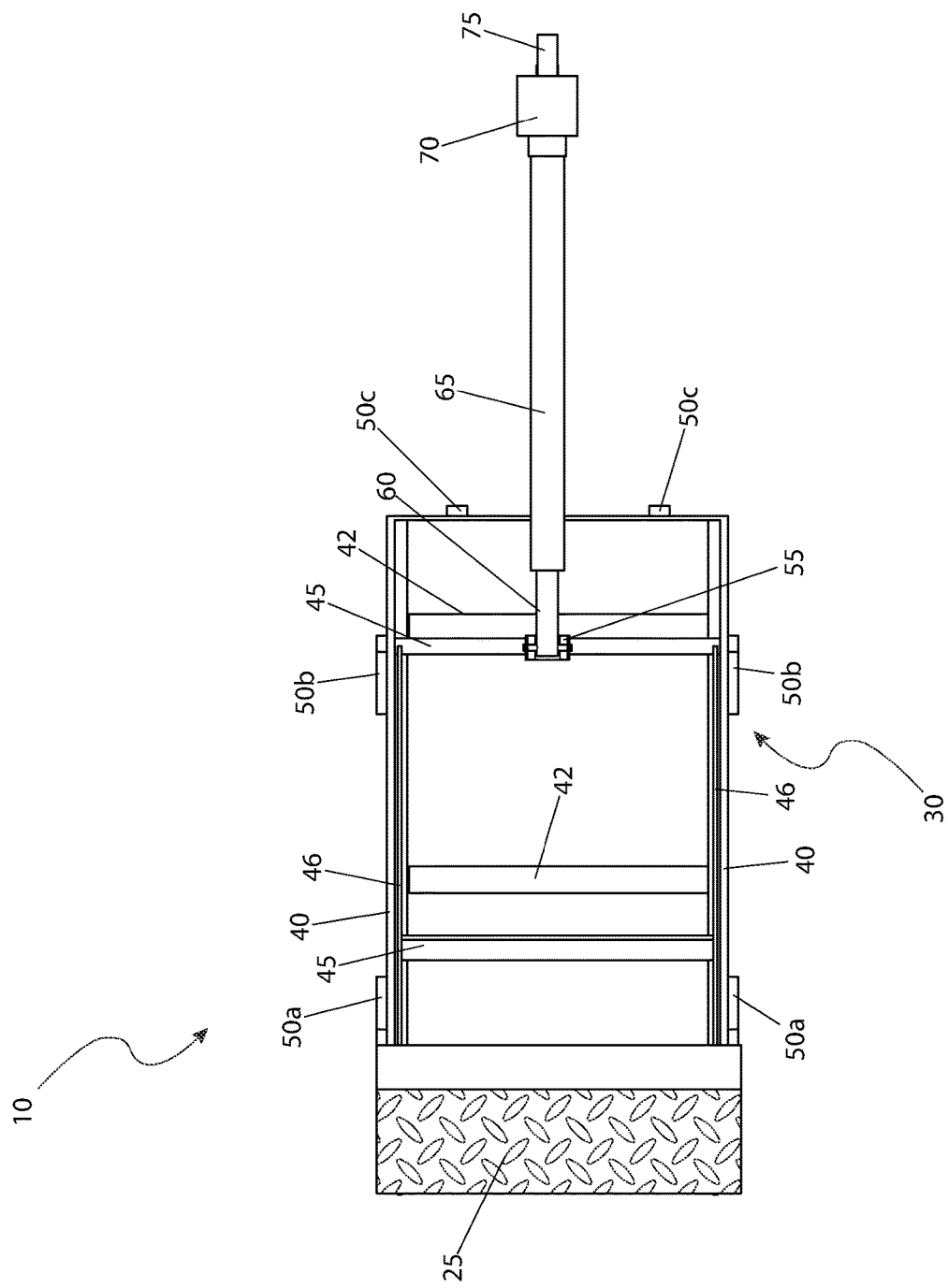
FIG. 3 is a sectional view of the retractable ladder system 10, as seen along a line I-I, as shown in FIG. 1, according to the preferred embodiment of the present invention.

Referring now to FIG. 3, a sectional view of the system 10, as seen along a line I-I, as shown in FIG. 1, according to the preferred embodiment of the present invention is shown. The steps 45 of the ladder 30 are shown supported within the ladder track side members 40 and ladder track cross members 42 in its stowed (retracted) position. The ladder track 40 is physically connected to a vehicle structural element 80 of the lifted vehicle 15 (as shown in FIG. 1) such as the frame with a plurality of vertical support members 50a, 50b, 50c. The outward side of the ladder system 10 is provided with the fixed upper step 25 while the opposite side of the ladder 30 is provided with a rotatable joint 55. The rotatable joint 55 is connected to an actuator rod 60 of a linear actuator 65. The opposite end of the linear actuator 65 is provided with an actuator motor 70. The linear actuator 65 and the actuator motor 70 are also supported to vehicle structural element 80 of the lifted vehicle 15 with an actuator motor support, such as the frame.

Figure 4:
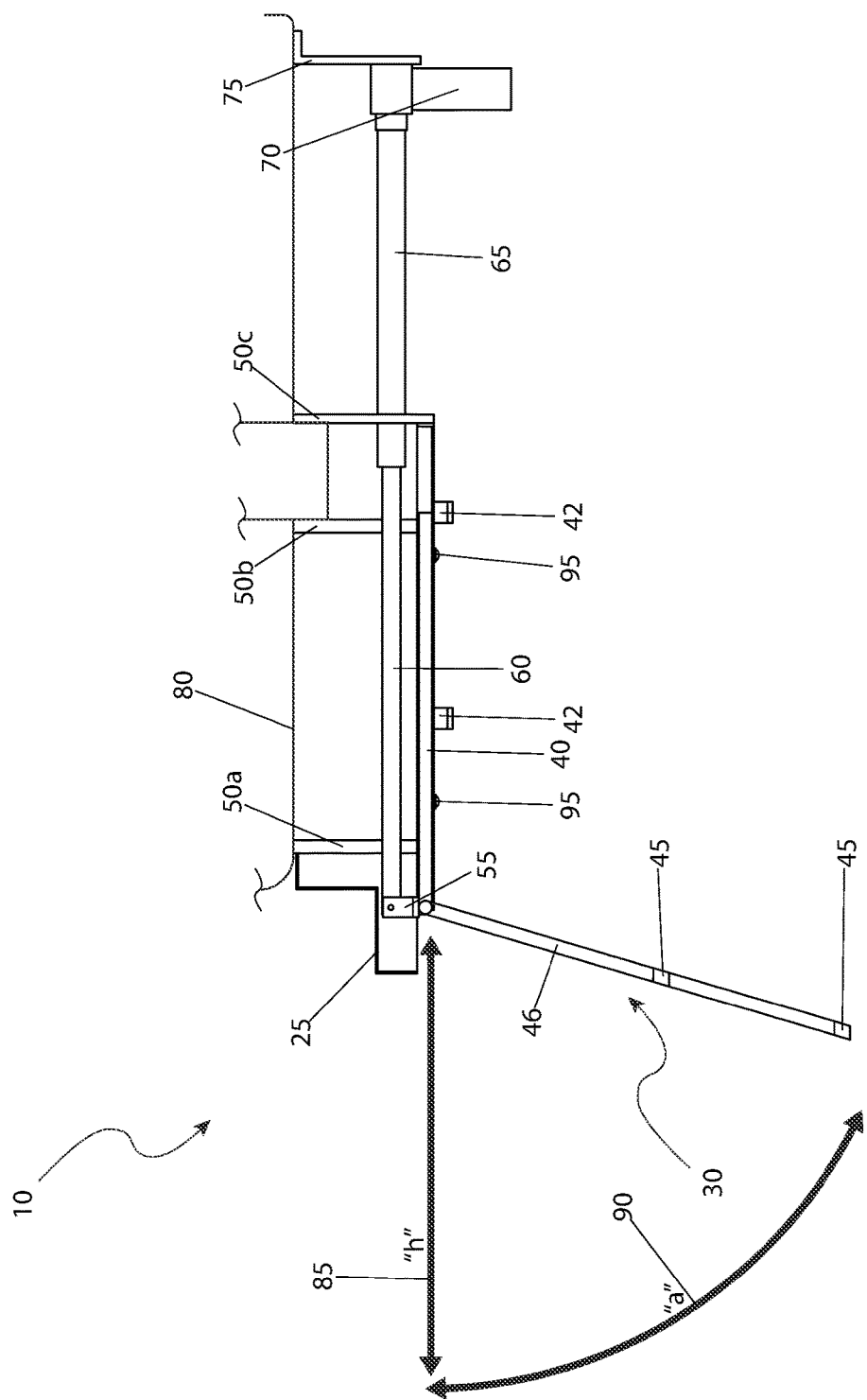
FIG. 4 is sectional view of the retractable ladder system 10, as seen along a line II-II, as shown in FIG. 1, according to the preferred embodiment of the present invention; and, FIG. 5 is an electrical block diagram of the retractable ladder system 10, according to the preferred embodiment of the present invention.

Referring next to FIG. 4, a sectional view of the system 10, as seen along a line II-II, as shown in FIG. 1, according to the preferred embodiment of the present invention is disclosed. As aforementioned described, the ladder track side members 40 are connected to a vehicle structural member 80 via a pair of first vertical support members 50a, a pair of second vertical support members 50b, and a pair of third vertical support members 50c. The ladder track cross members 42 are attached to the bottoms of ladder track side members 40 to provide structural support. Likewise, the linear actuator 65 and actuator motor 70 are connected to the vehicle structural member 80 via use of the actuator motor support 75. During the extension process, the ladder 30 extends underneath the fixed upper step 25 and outward along a horizontal travel path "h" 85 and an arcing travel path "a" 90 thus placing the steps 45 in a horizontal position suitable for ascending or descending. This motion is accomplished by the actuator rod 60 and the rotatable joint 55. A set of two (2) light assemblies 95 are mounted on each side of the ladder track side members 40 for a total of four (4) (note that only two (2) are shown in FIG. 4 due to illustrative limitations).

Figure 5:
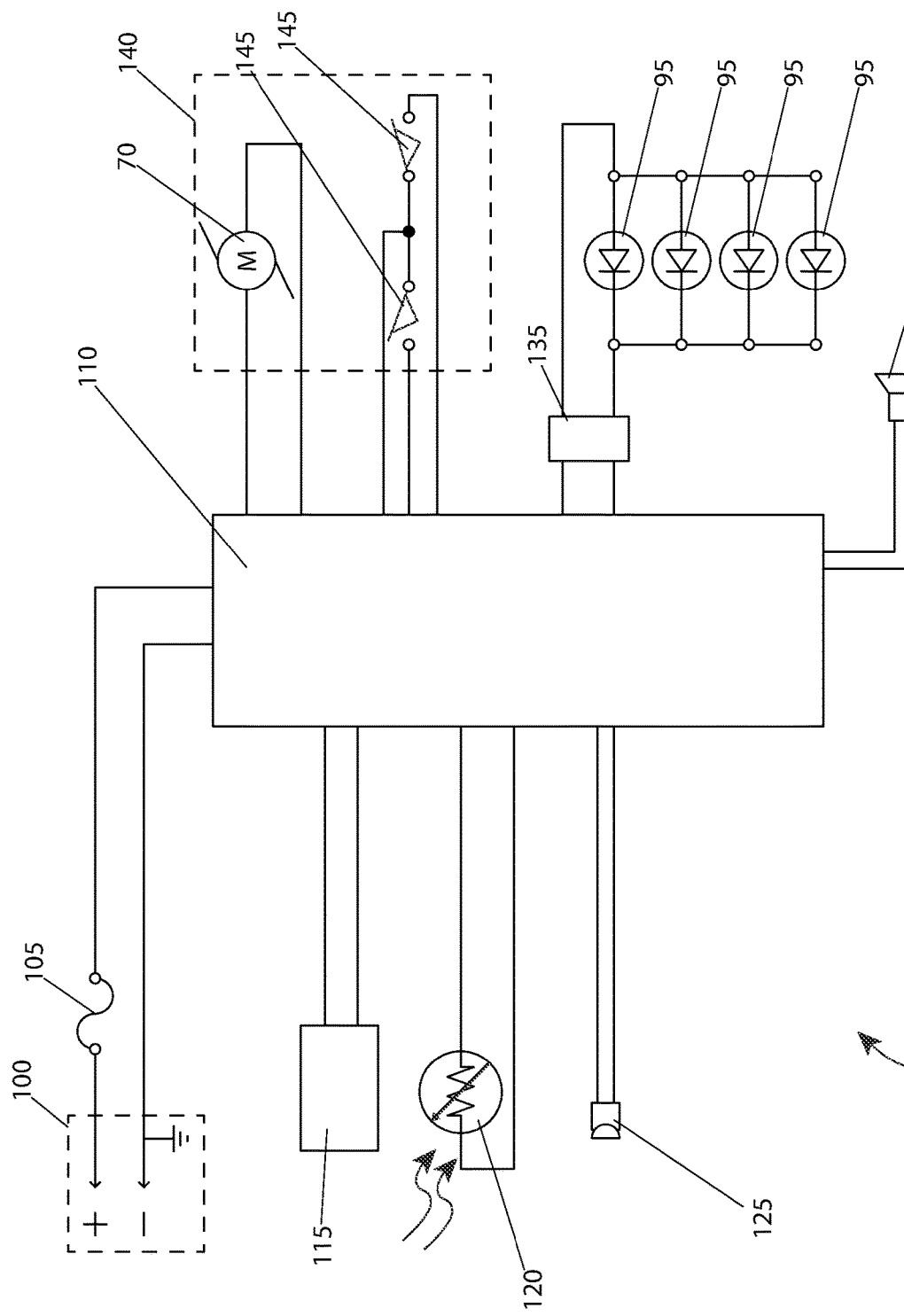

Referring to FIG. 5, an electrical block diagram of the system 10, according to the preferred embodiment of the present invention is depicted. Electrical power 100, envisioned to be 12-VDC is obtained from a suitable point on the lifted vehicle 15 (as shown in FIGS. 1 and 2) and is passed through an overcurrent protective device 105, here depicted as a fuse. Resultant power is then passed onto a main controller 110, envisioned to be a single board computer (SBC) such as an Arduino®, Raspberry Pi®, or the like equipped with necessary modules to handle excessive current. Inputs to the main controller 110, include an input controller 115 such as a dash-mounted double pole—double throw switch, a door-mounted jamb switch, a wireless key fob module, or the like. The exact method of control of the ladder system 10 is not intended to be a limiting factor of the present invention. Additional inputs include a light sensor 120, for control of the light assemblies 95 and a microphone 125 for the issuance of voice commands to the main controller 110. Outputs from the main controller 110 include a speaker 130 for issuance of audible warning alerts immediately prior to when the ladder 30 is extending or retracting. The light assemblies 95, here shown as LED lamp assemblies are powered through a driver circuit 135 and are preferably directed downward to provide lighting effects. The motor housing 140 contains the actuator motor 70 as well as travel limit switches 145, all of which are connected as an output of the main controller 110. The main controller 110 provides for all logic needed to operate the ladder system 10 such as when to activate the light assemblies 95, the amount of time needed to extend or retract the ladder 30, automatic timer operation. It is noted that the use of the main controller 110 is only one (1) of many different methods that can be implemented. Other methods include hard wired relay logic, interconnected independent modules, and the like.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 5. The user would procure the system 10 from conventional procurement channels such as aftermarket vehicle manufacturers, auto supply parts stores, discount stores, mail order and internet supply houses and the like. Special attention would be paid to overall size of the system 10 such that it installs properly on the subject lifted vehicle 15.

After procurement and prior to utilization, the system 10 would be prepared in the following manner: the system 10 would be installed on lifted vehicle 15 using appropriate fasteners in the vertical support members 50*a*, 50*b*, 50*c* and the actuator motor support 75 to connect it to the vehicle structural member 80; electrical power connections would be made at the electrical power 100; necessary control connections (if needed) would be provided for the input controller 115, the light sensor 120, the microphone 125, the speaker 130, and the light assemblies 95 would be made. At this point in time, the system 10 is tested for proper operation.

During utilization of the system 10, the following procedure would be initiated: when a user wishes to ascend into the passenger compartment 20 of the lifted vehicle 15, an appropriate signal using the input controller 115 would be generated. This action supplies power to the actuator motor 70 through the main controller 110 to move the actuator rod 60 outward and allow the ladder 30 to be positioned as shown in FIG. 2 and FIG. 4; when finished with ascension and the user is ready to operate the lifted vehicle 15, the ladder 30 is retracted by another appropriate signal that is generated through the input controller 115. This process is repeated when the user wishes to descend the ladder 30 in a similar manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A retractable ladder system, comprising:
   a fixed upper step permanently attached to a lifted pickup truck;
   a ladder extended and deployed from a ladder track, the ladder is extended in an outward position and is stowed in a retracted position;
   a rotatable joint connected to an actuator rod of a linear actuator, the rotatable joint is provided opposite the ladder;
   a light sensor for control of the light assemblies and a microphone for the issuance of voice commands to the main controller;
   a pair of light assemblies mounted on each side of the ladder track; and
   a plurality of electric power obtained from the lifted pickup truck.

2. The retractable ladder system, according to claim 1, wherein the ladder provides for a plurality of intermediate steps that the occupant ascends or descends when the ladder is in an outward position.

3. The retractable ladder system, according to claim 2, wherein the intermediate steps are two intermediate steps.

4. The retractable ladder system, according to claim 1, wherein the ladder track is directly connected to a structurally sound element of the lifted pickup truck.

5. The retractable ladder system, according to claim 4, wherein the structurally sound element of the lifted pickup truck is a frame by comprising of at least four vertical support members.

6. The retractable ladder system, according to claim 1, wherein the linear actuator and an actuator motor is connected to the vehicle structural member via use of the actuator motor support.

7. The retractable ladder system, according to claim 6, wherein an opposite end of the linear actuator is provided with the actuator motor.

8. The retractable ladder system, according to claim 7, wherein the at least four vertical support members, the linear actuator and the actuator motor are supported by the structurally sound element of the lifted pickup truck.

9. The retractable ladder system, according to claim 1, wherein the ladder extends underneath the fixed upper step and outward along a horizontal travel path "h" and an arcing travel path "a" thus placing the steps in a horizontal position for ascending or descending by the actuator rod and the rotatable joint.

10. The retractable ladder system, according to claim 1, wherein the electric power is passed through an overcurrent protective device.

11. The retractable ladder system, according to claim 10, wherein the overcurrent protective device is a fuse.

12. The retractable ladder system, according to claim 1, further comprising a plurality of resultant power is then passed onto a main controller that provides for all logic needed to operate the ladder system.

13. The retractable ladder system, according to claim 12, wherein the main controller is a single board computer.

14. The retractable ladder system, according to claim 12, wherein one or more inputs to the main controller are an input controller.

15. The retractable ladder system, according to claim 14, wherein the input controller is selected from the group consisting of a dash mounted double pole, a double throw switch, a door-mounted jamb switch, or a wireless key fob module.

16. The retractable ladder system, according to claim 1, further comprising a speaker for issuance of one or more audible warning alerts immediately prior to when the ladder is extending or retracting.

17. The retractable ladder system, according to claim 1, further comprising a motor housing containing the actuator motor as well as a plurality of travel limit switches, all of which are connected as an output of a main controller.

18. The retractable ladder system, according to claim 1, wherein the electric power is 12-VDC.

19. The retractable ladder system, according to claim 1, wherein the retractable ladder system allows one or more occupants of the lifted pickup truck to gain entry and exit a passenger compartment of the lifted pickup truck.

\* \* \* \* \*